United States Patent [19]

Johnson et al.

[11] 4,133,017
[45] Jan. 2, 1979

[54] ELECTRICAL POWER SUPPLY FAULT DETECTING SYSTEM

[75] Inventors: Lauren L. Johnson, Westchester; Robert J. Wilson, Bolingbrook, both of Ill.

[73] Assignee: General Motors Corporation, Detroit, Mich.

[21] Appl. No.: 855,164

[22] Filed: Nov. 28, 1977

[51] Int. Cl.² ............................................. H02H 3/28
[52] U.S. Cl. ...................................... 361/42; 340/645; 361/48
[58] Field of Search ......................... 361/20, 21, 33, 42, 361/47, 48; 340/645, 650, 651

[56] References Cited

U.S. PATENT DOCUMENTS

| | | | |
|---|---|---|---|
| 2,405,397 | 8/1946 | Bedford | 340/645 X |
| 3,270,331 | 8/1966 | Kirk et al. | 340/645 |
| 3,496,414 | 2/1970 | Logston | 361/33 |
| 3,675,080 | 7/1972 | Bath | 361/20 |

Primary Examiner—Harry E. Moose, Jr.
Attorney, Agent, or Firm—Richard G. Stahr

[57] ABSTRACT

To detect system ground faults and shorted alternator output winding turn-to-turn faults, the series combination of a resistor and the operating coil of an electrical relay having a normally closed contact pair is connected between the neutrals of two parallel connected polyphase alternator output winding groups, the junction between the resistor and operating coil is connected through a resistor to ground and the normally closed relay contact pair is connected in series in the alternator exciting field winding energizing circuit. To detect open diodes in the main polyphase diode bridge type full-wave rectifier circuit, an auxiliary polyphase full-wave rectifier circuit having the operating coil and normally closed contacts of two relays in series in each leg is provided. Upon the failure of a diode of the main rectifier circuit, sufficient current to operate the corresponding relay in the auxiliary rectifier circuit is diverted therethrough. Upon the operation of one of the auxiliary rectifier circuit relays, the magnitude of the energizing potential supplied to the alternator exciting field winding is reduced and upon the operation of more than one of the auxiliary rectifier circuit relays, the alternator exciting field winding energizing circuit is interrupted.

5 Claims, 1 Drawing Figure

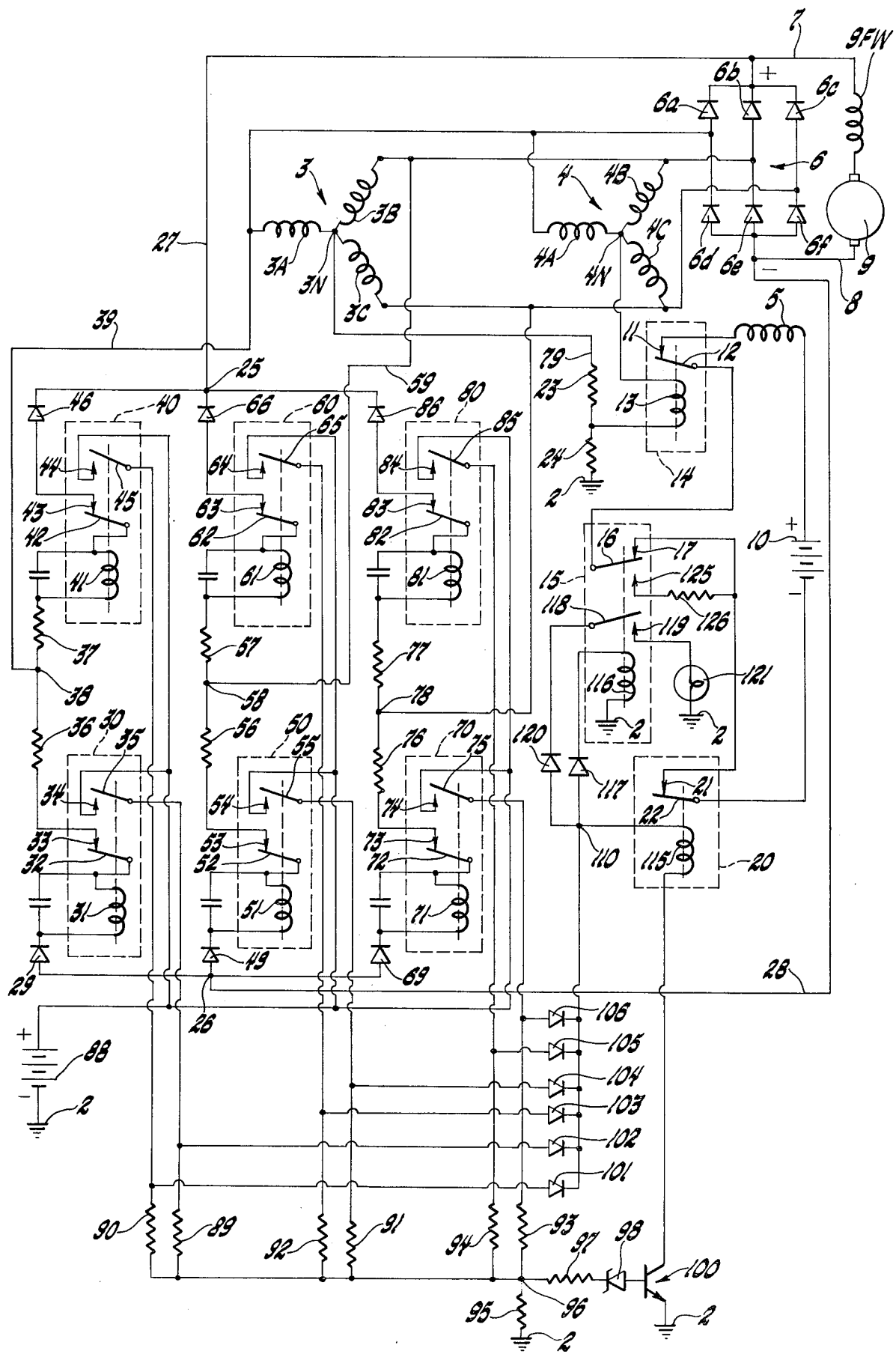

ELECTRICAL POWER SUPPLY FAULT DETECTING SYSTEM

This invention is directed to an electrical power supply fault detecting system and, more specifically, to a system of this type responsive to system ground faults, to alternator output winding turn-to-turn faults and to one or more open diodes in the main polyphase diode bridge type full-wave rectifier circuit.

With certain types of electrical power supply systems, particularly those employed with Diesel-electric locomotives, the polyphase output potential of a prime mover driven alternator is full-wave rectified by a polyphase diode bridge type full-wave rectifier circuit. The direct current output of the rectifier circuit is applied across a system output circuit which is isolated from ground. With power supply systems of this type, it is extremely important that system ground faults, alternator output winding turn-to-turn faults and main rectifier circuit open diodes be detected.

It is, therefore, an object of this invention to provide an improved electrical power supply fault detecting system.

It is another object of this invention to provide an improved electrical power supply fault detecting system of the type sensitive to system ground faults or to alternator output winding turn-to-turn faults to interrupt the alternator exciting field winding energizing circuit.

It is another object of this invention to provide an improved electrical power supply fault detecting system that is responsive to an open diode in an associated diode bridge type full-wave rectifier circuit to reduce system output potential.

It is an additional object of this invention to provide an improved electrical power supply fault detecting system that is sensitive to the failure of more than one diode in an associated diode bridge type full-wave rectifier circuit to interrupt the alternator exciting field winding energizing circuit.

In accordance with this invention, an electrical power supply fault detecting system is provided which, upon the occurrence of either a system ground fault or an alternator output winding turn-to-turn fault, operates to reduce system output potential to substantially zero; upon the failure of one diode of an associated diode bridge type full-wave rectifier circuit, operates to reduce system output potential to a predetermined fraction of normal system output potential and upon the failure of more than one diode of the associated diode bridge type full-wave rectifier circuit, operates to reduce system output potential to substantially zero.

In the drawing, point of reference or ground potential is the same point electrically and is illustrated by the accepted schematic symbol and referenced by the numeral 2.

Referring to the drawing, one example of an electrical power supply system with which the fault detecting system of this invention may be employed includes a polyphase alternator having two discrete parallel connected polyphase output winding groups 3 and 4 and an exciting field winding 5; a polyphase diode bridge type full-wave rectifier circuit 6 having three diodes 6a, 6b and 6c in the positive polarity diode bank and three diodes 6d, 6e and 6f in the negative polarity diode bank and positive and negative polarity output terminals through which the rectifier output potential of rectifier circuit 6 is applied across the system output circuit comprising positive polarity output circuit bus 7 and negative polarity output circuit bus 8. Buses 7 and 8 comprise the system output circuit and are isolated from point of reference or ground potential 2.

Alternator output winding group 3 includes three phase windings 3A, 3B and 3C connected in a Y-configuration having a neutral point 3N and alternator output winding group 4 includes three phase windings 4A, 4B and 4C connected in a Y-configuration having a neutral point 4N. The alternator output winding groups 3 and 4 are wound upon the same stator iron in such a manner that the voltages induced in phase windings 3A and 4A, 3B and 4B and 3C and 4C are in phase. The rotor of the alternator is driven by a suitable prime mover, not shown, such as a Diesel engine in a manner well known in the art.

One or more direct current electric motors, such as the series direct current motor 9 having a field winding 9FW, may be connected across the isolated system output circuit buses 7 and 8. Although only one direct current motor is illustrated in the drawing, it is to be specifically understood that more than one motor may be connected across the isolated system output circuit as is well known in the art.

The alternator exciting field winding 5 is connected in an energizing circuit including an energizing potential source, which may be a conventional storage battery 10. This energizing circuit also includes the normally closed contact pair, stationary contact 11 and movable contact 12, of an electrical relay 14, the normally closed contact pair, movable contact 16 and stationary contact 17 of an electrical relay 15 and the normally closed contact pair, stationary contact 21 and movable contact 22 of an electrical relay 20. Although the energizing potential source for exciting field winding 5 is illustrated in the drawing as a storage battery, it is to be specifically understood that this energizing potential source may take various forms such as the rectified output potential of an alternator or any other available direct current potential source suitable for this application.

To detect system ground or alternator output winding turn-to-turn faults in a manner to be later explained, neutral point 3N of alternator output winding group 3 is connected to neutral point 4N of alternator output winding group 4 through the series combination of a resistor 23 and operating coil 13 of electrical relay 14 and the junction between resistor 23 and operating coil 13 is connected to point of reference or ground potential 2 through resistor 24.

To detect the failure of one of the diodes of diode bridge type rectifier circuit 6 and reduce the magnitude of the energizing potential supplied to the alternator exciting field winding 5 and to detect the failure of more than one diode of diode bridge type rectifier circuit 6 and interrupt the alternator exciting field winding energizing circuit in a manner to be later explained, an auxiliary or second diode bridge type polyphase rectifier circuit having alternating current input and direct current output circuitry is employed. Included in each leg of the auxiliary rectifier circuit is the series combination of a first diode, the operating coil and a normally closed movable and stationary contact pair of a first electrical relay also having a normally open movable and stationary contact pair, first and second resistors, the operating coil and a normally closed movable and stationary contact pair of a second electrical relay also having a normally open movable and stationary contact pair and a second diode in that order. One leg of this auxiliary rectifier circuit includes the series combination of diode 29, operating coil 31 and the normally closed contact pair comprising movable contact 32 and stationary contact 33 of electrical relay 30 also having a normally open contact pair comprising stationary contact 34 and movable contact 35, resistors 36 and 37, operating coil 41 and the normally closed contact pair comprising movable contact 42 and stationary contact 43 of electrical relay 40 also having a normally open contact pair comprising stationary contact 44 and movable contact 45 and diode 46. Another leg of this auxiliary rectifier circuit includes the series combination of diode 49, operating coil 51 and the normally closed contact pair comprising movable contact 52 and stationary contact 53 of electrical relay 50 also having a normally open contact pair comprising stationary contact 54 and movable contact 55, resistors 56 and 57, operating coil 61 and the normally closed contact pair comprising movable contact 62 and stationary contact 63 of electrical relay 60 also having a normally open contact pair comprising stationary contact 64 and movable contact 65 and diode 66. A third leg of this auxiliary rectifier circuit includes the series combination of diode 69, operating coil 71 and the normally closed contact pair comprising movable contact 72 and stationary contact 73 of electrical relay 70 also having a normally open contact pair comprising stationary contact 74 and movable contact 75, resistors 76 and 77, operating coil 81 and the normally closed contact pair comprising movable contact 82 and stationary contact 83 of electrical relay 80 also having a normally open contact pair comprising stationary contact 84 and movable contact 85 and diode 86.

The junctions 38, 58 and 78 between respective series resistors 36 and 37, 56 and 57 and 76 and 77, to which the output terminal ends of alternator windings 3A-4A, 3B-4B and 3C-4C are connected through respective leads 39, 59 and 79 comprise the alternating current input circuitry of the auxiliary rectifier circuit. The positive polarity output terminal 25 and the negative polarity output terminal 26 of the auxiliary rectifier circuit are connected across the isolated system output circuit positive and negative polarity output circuit buses 7 and 8 through respective leads 27 and 28.

The output potential of a direct current potential source which may be a battery 88 or any other convenient source of direct current potential is applied across the normally open movable and stationary contact pairs of the electrical relays included in the auxiliary rectifier circuit. The positive polarity output terminal of battery 88 is connected to all of the stationary contacts 34, 44, 54, 64, 74 and 84 of the normally open contact pairs of the electrical relays included in the auxiliary rectifier circuit in parallel. Movable contacts 35, 45, 55, 65, 75 and 85 of the normally open contact pairs of these electrical relays are connected in parallel to point of reference or ground potential 2 through respective resistors 89, 90, 91, 92, 93 and 94 in parallel and single series resistor 95. The junction 96 between parallel resistors 89, 90, 91, 92, 93 and 94 and single series resistor 95 is connected through the series combination of resistor 97 and Zener diode 98 to the base electrode of an NPN transistor 100. The junction between each of movable contacts 35, 45, 55, 65, 75 and 85 and the respective corresponding resistors 89, 90, 91, 92, 93 and 94 are connected to a common junction point 110 through respective diodes 101, 102, 103, 104, 105 and 106.

Operating coil 115 of electrical relay 20 is connected across junction 110 and the collector electrode of NPN transistor 100, operating coil 116 of electrical relay 15 is connected across junction 110 and point of reference or ground potential 2 through diode 117 and movable contact 118 and stationary contact 119 of relay 15 are connected across junction 110 and point of reference or ground potential 2 through diode 120 and indicator lamp 121.

Upon the occurrence of a turn-to-turn fault in any of the output windings of the alternator output winding groups, the neutral point of the output winding group in which the turn-to-turn fault occurs, shifts. Consequently, an energizing potential is applied across operating coil 13 of electrical relay 14 which may be traced from either neutral point 3N of the alternator output winding group 3 or neutral point 4N of the alternator output winding group 4, whichever is at a potential higher than the other, through resistor 23. Upon the energization of operating coil 13, movable contact 12 is moved out of electrical circuit engagement with stationary contact 11 to interrupt the alternator exciting field winding energizing circuit, previously described, a condition which reduces the system output potential to substantially zero.

Should a ground fault occur in the isolated positive polarity system output circuit bus 7, an energizing circuit for operating coil 13 of relay 14 is completed from the positive polarity output terminal of rectifier circuit 6, through the ground fault and point of reference or ground potential 2, resistor 24, operating coil 13 of electrical relay 14 to the neutral point 4N of the alternator output winding group 4. It may be noted that a circuit is also completed through resistors 24 and 23 to neutral point 3N of the alternator output winding group 3, however, because of the difference of ohmic resistance values between resistor 23 and operating coil 13, sufficient energizing current flows through operating coil 13 to operate movable contact 12 out of electrical circuit engagement with stationary contact 11 to interrupt the alternator exciting field winding energizing circuit.

Should a ground fault occur in the isolated negative polarity system output circuit bus 8, a similar energizing circuit for operating coil 13 of electrical relay 14 may be traced from the positive polarity output terminal of rectifier circuit 6, through the ground fault and point of reference or ground potential 2, resistor 24 and operating coil 13 of electrical relay 14 to the neutral point 4N of the alternator output winding group 4. Although a circuit may also be traced through resistors 24 and 23 to the neutral point 3N of the alternator output winding group 3, for the same reason as previously explained, sufficient energizing current flows through operating coil 13 to operate movable contact 12 out of electrical circuit engagement with stationary contact 11 to interrupt the alternator exciting field 5 energizing circuit.

Should a ground fault occur in any of the alternating current lines connected to the alternating current input terminals of rectifier circuit 6, a similar energizing circuit for operating coil 13 of electrical relay 14 is established. Assuming that a ground fault occurs in the line interconnecting output windings 3B and 4B of the alternator output winding groups, when the output terminal ends of output windings 3B and 4B become positive, a circuit may be traced from these output windings, through the ground fault, point of reference or ground potential 2, resistor 24 and operating coil 13 of electrical relay 14 to neutral point 4N of the alternator output winding group 4. For the same reason as previously set forth, upon the completion of this energizing circuit, sufficient energizing current flows through operating coil 13 to operate movable contact 12 out of electrical circuit engagement with stationary contact 11 to interrupt the alternator exciting field winding 5 energizing circuit.

The ground fault energizing circuits of operating coil 13 of electrical relay 14 just described are examples only as similar energizing circuits may be traced for ground faults occurring in any part of the system.

In the event of an open diode in the positive polarity diode bank of rectifier circuit 6, single phase operation of the system results. Consequently, the magnitude of the energizing current supplied to the alternator exciting field winding 5 must be reduced. For purposes of this specification, it is assumed that diode 6a of the positive polarity bank of diodes of rectifier circuit 6 becomes open. When the output terminal ends of alternator output windings 3A and 4A of alternator winding groups 3 and 4 become positive, the resulting load current is directed through lead 39, junction 38 of the auxiliary bridge rectifier circuit, resistor 37, operating coil 41 of relay 40, closed contacts 42 and 43 of relay 40, diode 46, positive polarity output circuit terminal 25 of the auxiliary bridge rectifier circuit and lead 27 to the positive polarity output circuit bus 7. Upon the flow of load current through this circuit, operating coil 41 of relay 40 is energized. In response to this operating coil 41 energization, movable contact 42 of relay 40 is operated out of electrical circuit engagement with stationary contact 43 and movable contact 45 is operated into electrical circuit engagement with stationary contact 44. Upon the closure of movable contact 45 to stationary contact 44, the potential of battery 88 is applied across resistors 90 and 95 in series, consequently, a potential appears upon junction 96 of a positive polarity with respect to point of reference or ground potential 2. Zener diode 98 is selected to have an inverse breakdown potential greater than the potential level present upon junction 96 at this time, consequently, NPN transistor 100 remains not conductive. The potential appearing across series resistors 90 and 95, however, is applied through diode 101 to common junction point 110. This potential energizes operating coil 116 of electrical relay 15 through a circuit which may be traced from the positive polarity output terminal of battery 88, through closed electrical contacts 44 and 45 of relay 40, diodes 101 and 117, operating coil 116 and point of reference or ground potential 2 to the negative polarity output terminal of battery 88. Upon the energization of operating coil 116 of electrical relay 15, movable contact 16 is operated out of electrical circuit engagement with stationary contact 17 and into electrical circuit engagement with stationary contact 125 and movable contact 118 is operated into electrical circuit engagement with stationary contact 119. Upon the operation of movable contact 16 into electrical circuit engagement with stationary contact 125, a resistor 126 is placed in series in the previously described alternator exciting field winding 5 energizing circuit to reduce the magnitude of the energizing potential supplied to the exciting field winding 5 by an amount equal to the potential drop across resistor 126, a condition which reduces the output system potential to a predetermined lower level.

Upon the operation of movable contact 118 into electrical circuit engagement with stationary contact 119, an energizing circuit is completed for indicator lamp 121 which may be traced from positive polarity output terminal of battery 88, through closed contacts 44 and 45 of electrical relay 40 of the auxiliary rectifier circuit, diodes 101 and 120, closed contacts 118 and 119 of electrical relay 15, indicator lamp 121 and point of reference or ground potential 2 to the negative polarity output terminal of battery 88. Upon the completion of this energizing circuit, indicator lamp 121 illuminates to indicate that one of the diodes of rectifier circuit 6 is open.

For purposes of this specification, it is further assumed that diode 6f of the negative polarity bank of diodes of rectifier circuit 6 also becomes open while diode 6a is open. When the output terminal ends of output windings 3C and 4C of alternator output winding groups 3 and 4 become negative, the resulting load current is directed from the negative polarity output circuit bus 8 through lead 28 to the negative polarity output terminal 26 of the auxiliary rectifier circuit, through diode 69, operating coil 71 of electrical relay 70, closed contacts 72 and 73 of relay 70, resistor 76, junction 78 and lead 79 to the output terminal ends of output windings 3C and 4C of the alternator output winding groups 3 and 4. Upon the flow of load current through this circuit, operating coil 71 of relay 70 is energized. In response to this operating coil 71 energization, movable contact 72 of relay 70 is operated out of electrical circuit engagement with stationary contact 73 and movable contact 75 is operated into electrical circuit engagement with stationary contact 74. Upon the closure of movable contact 75 to stationary contact 74, the potential of battery 88 is applied across the combination of resistors 90 and 93 in parallel and resistor 95 in series, consequently, the potential now appearing upon junction 96 is of a higher positive polarity magnitude than that of the potential thereon when only series resistors 90 and 95 are in the circuit. Consequently, in response to this higher potential upon junction 96, Zener diode 98 breaks down and conducts in a reverse direction to supply emitter-base drive current to NPN transistor 100. This drive current triggers transistor 100 conductive through the collector-emitter electrodes thereof to complete an energizing circuit for operating coil 115 of electrical relay 20 which may be traced from the positive polarity output terminal of battery 88, through the closed contact pair 44 and 45 of electrical relay 40 and the closed contact pair 74 and 75 of electrical relay 70 in parallel, diodes 101 and 106 in parallel, common junction point 110, operating coil 115, the collector-emitter electrodes of NPN transistor 100 and point of reference or ground potential 2 to the negative polarity output terminal of battery 88. Upon the energization of operating coil 115, movable contact 22 of electrical relay 20 is operated out of electrical circuit engagement with stationary contact 21 to interrupt the alternator exciting field winding 5 energizing circuit. Upon the interruption of this energizing circuit, the system output potential is reduced to substantially zero.

From this description, it is apparent that the auxiliary rectifier circuit and electrical relay 15 is responsive to the failure of one diode of the bridge rectifier circuit 6 to reduce the magnitude of the energizing potential supplied to the alternator exciting field winding 5 and that the auxiliary rectifier circuit, NPN transistor 100 and electrical relay 20 are responsive to the failure of more than one diode in bridge rectifier circuit 6 for interrupting the alternator exciting field winding 5 energizing circuit.

While a preferred embodiment of the present invention has been shown and described, it will be obvious to those skilled in the art that various modifications and substitutions may be made without departing from the spirit of the invention which is to be limited only within the scope of the appended claims.

We claim:

1. An electrical power supply fault detecting system for use with an alternator of the type having an exciting field winding connected in an energizing circuit including an energizing potential source and two discrete parallel connected polyphase output winding groups each having a neutral point, comprising:
    a diode bridge type polyphase rectifier circuit for full wave rectifying the output potential of said alternator output winding groups;
    means for applying the rectified output potential of said rectifier circuit across an output circuit isolated from a selected point of reference or ground potential;
    circuit means including the series combination of a first resistor and the actuating means of an electrically operable switching device interconnecting said neutral points of said output winding groups, said switching device having normally conductive electrical current carrying means connected in series in said exciting field winding energizing circuit whereby a flow of current through said circuit means as a result of an alternator output winding turn to turn short effects the operation of said switching device to interrupt said exciting field winding energizing circuit; and
    a second resistor connected across the junction between said first resistor and said actuating means of said switching device and said selected point of reference or ground potential whereby a system fault to said selected point of reference or ground potential effects the operation of said switching device to interrupt said exciting field winding energizing circuit.

2. An electrical power supply fault detecting system for use with an alternator of the type having an exciting field winding connected in an energizing circuit including an energizing potential source and two discrete parallel connected polyphase output winding groups each having a neutral point, comprising:
    a diode bridge type polyphase rectifier circuit for full wave rectifying the output potential of said alternator output winding groups;
    means for applying the rectified output potential of said rectifier circuit across an output circuit isolated from a selected point of reference or ground potential;
    circuit means including the series combination of a first resistor and the actuating means of an electrically operable switching device interconnecting said neutral points of said output winding groups, said switching device having two normally conductive electrical current carrying means connected in series in said exciting field winding energizing circuit whereby a flow of current through said circuit means as a result of an alternator output winding turn to turn short effects the operation of said switching device to interrupt said exciting field winding energizing circuit;
    a second resistor connected across the junction between said first resistor and said actuating means of said switching device and said selected point of reference or ground potential whereby a system fault to said selected point of reference or ground potential effects the operation of said switching device to interrupt said exciting field winding energizing circuit; and
    means responsive to the failure of one diode of said diode bridge type rectifier circuit for reducing the magnitude of the energizing potential supplied to said exciting field winding and to the failure of more than one diode of said diode bridge type rectifier circuit for interrupting said exciting field winding energizing circuit.

3. An electrical power supply fault detecting system for use with an alternator of the type having an exciting field winding connected in an energizing circuit including an energizing potential source and two discrete parallel connected polyphase output winding groups each having a neutral point, comprising:
    a diode bridge type polyphase rectifier circuit for full wave rectifying the output potential of said alternator output winding groups;
    means for applying the rectified output potential of said rectifier circuit across an output circuit isolated from a selected point of reference or ground potential;
    circuit means including the series combination of a first resistor and the operating coil of an electric relay interconnecting said neutral points of said output winding groups, said relay having two normally closed electrical contacts connected in series in said exciting field winding energizing circuit whereby a flow of current through said circuit means as a result of an alternator output winding turn to turn short effects the operation of said relay to interrupt said exciting field winding energizing circuit; and
    a second resistor connected across the junction between said first resistor and said operating coil of said relay and said selected point of reference or ground potential whereby a system fault to said selected point of reference or ground potential effects the operation of said relay to interrupt said exciting field winding energizing circuit.

4. An electrical power supply fault detecting system for use with an alternator of the type having an exciting field winding connected in an energizing circuit including an energizing potential source and two discrete parallel connected polyphase output winding groups each having a neutral point, comprising:
    a diode bridge type polyphase rectifier circuit for full wave rectifying the output potential of said alternator output winding groups;
    means for applying the rectified output potential of said rectifier circuit across an output circuit isolated from a selected point of reference or ground potential;
    circuit means including the series combination of a first resistor and the operating coil of an electric relay interconnecting said neutral points of said output winding groups, said relay having two normally closed electrical contacts connected in series in said exciting field winding energizing circuit whereby a flow of current through said circuit means as a result of an alternator output winding turn to turn short effects the operation of said relay to interrupt said exciting field winding energizing circuit;

a second resistor connected across the junction between said first resistor and said operating coil of said relay and said selected point of reference or ground potential whereby a system fault to said selected point of reference or ground potential effects the operation of said relay to interrupt said exciting field winding energizing circuit; and means responsive to the failure of one diode of said diode bridge type rectifier circuit for reducing the magnitude of the energizing potential supplied to said exciting field winding and to the failure of more than one diode of said diode bridge type rectifier circuit for interrupting said exciting field winding energizing circuit.

5. An electrical power supply fault detecting system for use with an alternator of the type having an exciting field winding connected in an energizing circuit including an energizing potential source and two discrete parallel connected polyphase output winding groups each having a neutral point, comprising:

a first diode bridge type polyphase full-wave rectifier circuit for full wave rectifying the output potential of said alternator output winding groups;

means for applying the rectified output potential of said first rectifier circuit across a system output circuit isolated from a selected point of reference or ground potential;

circuit means including the series combination of a first resistor and the operating coil of an electrical relay interconnecting said neutral points of said output winding groups, said relay having two normally closed electrical contacts connected in series in said exciting field winding energizing circuit whereby a flow of current through said circuit means as a result of an alternator output winding turn to turn short effects the operation of said relay to interrupt said exciting field winding energizing circuit;

a second resistor connected across the junction between said first resistor and said operating coil of said relay and said selected point of reference or ground potential whereby a system fault to said selected point of reference or ground potential effects the operation of said relay to interrupt said exciting field winding energizing circuit;

a second diode bridge type polyphase rectifier circuit having alternating current input and direct current output circuit means, said second rectifier circuit having in each leg thereof the series combination of a first diode, the operating coil and normally closed movable and stationary contact pair of a first electrical relay also having a normally open movable and stationary contact pair, first and second resistors, the operating coil and normally closed movable and stationary contact pair of a second electrical relay also having a normally open movable and stationary contact pair and a second diode in that order;

means for connecting said direct current output circuit means of said second rectifier circuit across said isolated system output circuit;

means for applying the output potential of said parallel connected alternator output winding groups to said alternating current input circuit means of said second rectifier circuit;

means for applying a direct current potential across said normally open movable and stationary contact pairs of said electrical relays of said second rectifier circuit in parallel;

means responsive to the closure of one of said normally open movable and stationary contact pairs of said electrical relays of said second rectifier circuit in response to the failure of one diode of said first rectifier circuit for reducing the magnitude of the energizing potential supplied to said exciting field winding; and means responsive to the closure of more than one of said normally open movable and stationary contact pairs of said electrical relays of said second rectifier circuit in response to the failure of more than one diode of said first rectifier circuit for interrupting said exciting field winding energizing circuit.

* * * * *